(12) United States Patent
Kawashima et al.

(10) Patent No.: US 10,479,403 B2
(45) Date of Patent: Nov. 19, 2019

(54) VEHICLE DRIVING ASSISTANCE SYSTEM

(71) Applicant: TOYOTA JIDOSHA KABUSHIKI KAISHA, Toyota-shi, Aichi-ken (JP)

(72) Inventors: Risa Kawashima, Toyota (JP); Akihiko Shimizu, Nisshin (JP); Hiroki Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 15/855,461

(22) Filed: Dec. 27, 2017

(65) Prior Publication Data

US 2018/0237066 A1    Aug. 23, 2018

(30) Foreign Application Priority Data

Feb. 22, 2017  (JP) ................. 2017-030970

(51) Int. Cl.
*B62D 15/02* (2006.01)
*B60W 30/04* (2006.01)

(52) U.S. Cl.
CPC .......... *B62D 15/025* (2013.01); *B60W 30/04* (2013.01); *B60W 2420/42* (2013.01); *B60W 2420/52* (2013.01); *B60W 2520/125* (2013.01); *B60W 2520/28* (2013.01); *B60W 2540/20* (2013.01); *B60W 2550/306* (2013.01); *B60W 2710/20* (2013.01)

(58) Field of Classification Search
CPC ... B62D 15/025; B62D 15/026; B60W 30/04; B60W 2420/42; B60W 2520/125; B60W 2520/28; B60W 2540/20; B60W 2550/306; B60W 2710/20

USPC ......................................................... 701/41
See application file for complete search history.

(56) References Cited

U.S. PATENT DOCUMENTS

| | | |
|---|---|---|
| 5,765,116 A | 6/1998 | Wilson-Jones et al. |
| 2013/0131925 A1 | 5/2013 | Isaji et al. |
| 2015/0088382 A1 | 3/2015 | Obuchi |

(Continued)

FOREIGN PATENT DOCUMENTS

| | | |
|---|---|---|
| JP | H07-104850 A | 4/1995 |
| JP | 2011-045032 A | 3/2011 |
| JP | 2013-126854 A | 6/2013 |

(Continued)

*Primary Examiner* — Gertrude Arthur Jeanglaude
(74) *Attorney, Agent, or Firm* — Oliff PLC

(57) ABSTRACT

A vehicle driving assistance system, including: a forward information acquirer; a turning intention receiver; a steering-force applying device; and an assistance processing executing device including an identifying portion for identifying a traveling track of a preceding vehicle, a recognizing portion for recognizing turning of the preceding vehicle to the right or the left, a recognizing portion for recognizing turning of an own vehicle and a direction of the turning, and a steering-force control portion for executing a steering-force control in turning in which the applying device applies a steering force for assisting the turning of the own vehicle along an identified traveling track, when the recognized turning of the preceding vehicle is turning at an intersection present on a traveling path of the own vehicle and a direction of the turning of the preceding vehicle at the intersection coincides with the recognized direction of the turning of the own vehicle.

9 Claims, 5 Drawing Sheets

(56) References Cited

U.S. PATENT DOCUMENTS

2015/0329108 A1* 11/2015 Kodaira .............. B62D 15/025
                                                            701/41
2016/0339959 A1* 11/2016 Lee .................... B62D 15/0265

FOREIGN PATENT DOCUMENTS

| JP | 2015-058920 A | 3/2015 |
| JP | 2016-064746 A | 4/2016 |

* cited by examiner

VEHICLE DRIVING ASSISTANCE SYSTEM

CROSS REFERENCE TO RELATED APPLICATION

The present application claims priority from Japanese Patent Application No. 2017-030970, which was filed on Feb. 22, 2017, the disclosure of which is herein incorporated by reference in its entirety.

BACKGROUND

Technical Field

The following disclosure relates to a system for assisting a driver in driving a vehicle.

Description of Related Art

Various techniques for assisting a driver in driving a vehicle have been actively studied in recent years, and various techniques relating to a steering operation have been proposed. For instance, the Patent Literature 1 (Japanese Patent Application Publication No. 7-104850) describes a system configured to apply a steering force based on lane division lines that exist on opposite sides of an own vehicle, such that the steering force permits the own vehicle to travel in the middle between the lane division lines.

SUMMARY

The technique described in the Patent Literature 1 is based on a precondition that the lane division lines exist. Thus, the assistance by the system is not available not only when the vehicle travels in an environment in which no lane division lines exist but also when the vehicle turns at an intersection at which the lane division lines discontinue. Accordingly, the present disclosure relates to a system that suitably assists driving of the vehicle when the vehicle turns at an intersection.

In one aspect of the present disclosure, the vehicle driving assistance system is configured to apply, to a wheel, a steering force for assisting an own vehicle in turning along a traveling track of a preceding vehicle when the preceding vehicle turns at an intersection and the own vehicle also turns at the intersection in the same direction.

According to the vehicle driving assistance system, a driver enables the own vehicle to easily turn at the intersection so as to follow the preceding vehicle by the applied steering force when the own vehicle turns at the intersection.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention. Various forms of the claimable invention may become an invention described in claims.

(1) A vehicle driving assistance system for assisting a driver in driving a vehicle, including:
a forward information acquirer configured to acquire forward information for an own vehicle;
a turning intention receiver configured to receive an intention of the driver to turn the own vehicle to the right or the left;
a steering-force applying device configured to apply a steering force to a wheel; and
an assistance processing executing device configured to execute processing for assisting driving of the own vehicle,
wherein the assistance processing executing device includes:
a traveling track identifying portion configured to identify a traveling track of a preceding vehicle that travels ahead of the own vehicle, based on the forward information acquired by the forward information acquirer;
a preceding vehicle turning recognizing portion configured to recognize turning of the preceding vehicle to the right or the left;
an own vehicle turning recognizing portion configured to recognize turning of the own vehicle and a direction of the turning of the own vehicle, based on the intention of the driver received by the turning intention receiver; and
a steering-force control portion configured to execute a steering-force control in turning in which the steering-force applying device applies, to the wheel, the steering force for assisting the turning of the own vehicle along the traveling track of the preceding vehicle identified by the traveling track identifying portion, when the turning of the preceding vehicle recognized by the preceding vehicle turning recognizing portion is turning at an intersection that is present on a traveling path of the own vehicle and a direction of the turning of the preceding vehicle at the intersection coincides with the direction of the turning of the own vehicle recognized by the own vehicle turning recognizing portion.

This form is a basic form of the claimable invention. According to the vehicle driving assistance system of this form, when the own vehicle turns at the intersection present on its traveling path, the driver enables the own vehicle to easily turn at the intersection so as to follow the preceding vehicle by the applied steering force. The traveling path of the own vehicle may be considered as a route along which the own vehicle is to travel.

Examples of the "forward information acquirer" in this form include a camera, a radar, and the like, to monitor the front side of the own vehicle. The "forward information" contains information about a vehicle that travels ahead of the own vehicle. (The vehicle will be hereinafter referred to as "preceding vehicle" where appropriate.) In an instance where the own vehicle is equipped with a device (which will be referred to as "receiver" where appropriate) configured to receive information about operations of the preceding vehicle and information about behaviors of the preceding vehicle which are transmitted from the preceding vehicle, the receiver may function as the forward information acquirer. Examples of the "turning intention receiver" in this form include an operation lever of direction indicators (i.e., a winker lever) and a switch for directly instructing the vehicle to make a right turn or a left turn. In an instance where the vehicle is equipped with a voice recognition device configured to recognize spoken words by the driver and the driver indicates his/her intention by voice, the voice recognition device may be considered as the turning intention receiver.

The "steering-force applying device" in this form may apply, to the wheel, only the steering force generated in the steering-force control in turning. In addition to the steering force generated in the steering-force control in turning, the "steering-force applying device" may apply an assist force in the so-called power steering system, namely, a steering force having a magnitude in accordance with a detected operating force by the driver to assist a steering operation by the driver. In view of this, it is possible to utilize, as the steering-force applying device in this form, an ordinary known steering-force applying device that constitutes the power steering.

The "assistance processing executing device" in this form may be constituted so as to include a computer as a main constituent element. In an instance where the computer executes processing according to a suitable program, functional portions of the assistance processing executing device, such as the "traveling track identifying portion", the "preceding vehicle turning recognizing portion", the "own vehicle turning recognizing portion", and the "steering-force control portion", may be considered as being virtually constructed by the processing according to the program.

The "preceding vehicle" in this form is not limited to a vehicle which is traveling immediately ahead of the own vehicle. (The vehicle will be hereinafter referred to as "immediately preceding vehicle" where appropriate). For instance, a vehicle which is traveling ahead of the immediately preceding vehicle may be the "preceding vehicle" for the own vehicle. Here, processing including the "steering-force control in turning" by the steering-force control portion, namely, processing executed by the assistance processing executing device for assisting turning of the own vehicle along the traveling track of the preceding vehicle, is defined as "preceding-vehicle following processing in turning". In this case, a vehicle as a target vehicle to follow in the preceding-vehicle following processing in turning may be not only the immediately preceding vehicle but also the vehicle which is traveling ahead of the immediately preceding vehicle. The "traveling track of the preceding vehicle" in this form may be defined as a line on which the center of the preceding vehicle has passed.

(2) The vehicle driving assistance system according to the form (1), wherein the steering-force control portion is configured to execute a steering-force control in straight-ahead traveling in which the steering-force applying device applies, to the wheel, the steering force for assisting straight-ahead driving of the own vehicle along the traveling track of the preceding vehicle identified by the traveling track identifying portion, when the preceding vehicle and the own vehicle travel straight ahead on the traveling path of the own vehicle.

By applying the steering force to the wheel, it makes easy for the own vehicle to travel straight ahead and follow the preceding vehicle which travels straight ahead. Here, processing executed by the assistance processing executing device for assisting such following of the preceding vehicle by the own vehicle is defined as "preceding-vehicle following processing in straight-ahead traveling". In this case, the preceding-vehicle following processing in straight-ahead traveling is suitable for assisting driving of the vehicle in a situation in which there exist no lane division lines that define a lane in which the vehicle travels. Conversely, this form may be considered as a form in which the preceding-vehicle following processing in turning is also executable in the vehicle driving assistance system in which the preceding-vehicle following processing in straight-ahead traveling is executed. Here, control of the steering force executed by the steering-force control portion in the preceding-vehicle following processing in straight-ahead traveling may be referred to as "steering-force control in straight-ahead traveling". Further, the steering-force control in turning and the steering-force control in straight-ahead traveling may be collectively referred to as "steering-force control", and the preceding-vehicle following processing in turning and the preceding-vehicle following processing in straight-ahead traveling may be collectively referred to as "preceding-vehicle following processing". In this form, "straight-ahead traveling" does not mean that the vehicle travels geometrically straightforward such that its wheels are not steered, but means that the vehicle travels along its traveling path, namely, the vehicles travels along the road. Thus, "straight-ahead traveling" in this form conceptually includes changing the position of the vehicle in the right-left direction within its traveling path and traveling along curvature in a curved traveling path. In this respect, the changing the position of the vehicle in the right-left direction within its traveling path is a concept that includes a lane change.

(3) The vehicle driving assistance system according to the form (1) or (2), wherein the steering-force control portion is configured to control the steering-force applying device to apply, to the wheel, the steering force having a magnitude in accordance with a shift amount of the own vehicle from the traveling track of the preceding vehicle identified by the traveling track identifying portion.

In this form, a specific way of the steering-force control is limited. This form enables the own vehicle to turn without being largely shifted relative to the traveling track of the preceding vehicle which turns. More specifically, the steering force in a direction to eliminate the shift is increased with an increase in the shift amount.

(4) The vehicle driving assistance system according to any one of the forms (1) through (3), wherein the assistance processing executing device is configured to request the driver to indicate his/her intention to turn the own vehicle on the turning intention receiver, when the preceding vehicle turning recognizing portion recognizes the turning of the preceding vehicle at the intersection to the right or the left.

On one occasion, the preceding-vehicle following processing in turning is initiated when the preceding vehicle turns after a time point when the driver of the own vehicle indicates his/her intention to turn. On another occasion, the preceding-vehicle following processing in turning is initiated when the driver of the own vehicle indicates the intention to turn after a time point when the preceding vehicle starts turning. This form is suitable for the latter occasion. The request for indication of the turning intention in this form is not limited to particular means, but may be performed by sound generation from a speaker provided on an instrument panel of the own vehicle or by illumination or blinking of an indicator provided on the instrument panel. In this form, when the turning intention to turn the own vehicle is not indicated even when a set time elapses after the request has been made, for instance, the own vehicle turning recognizing portion may recognize that the own vehicle is to travel straight ahead.

(5) The vehicle driving assistance system according to any one of the forms (1) through (4), further comprising an intersection information acquirer configured to acquire information about the intersection present on the traveling path of the own vehicle, wherein the steering-force control portion is configured to execute the steering-force control in turning when the preceding vehicle and the own vehicle turn at the intersection identified based on the information acquired by the intersection information acquirer.

Even when the preceding vehicle behaves as if it will turn, the preceding vehicle does not necessarily turn at an intersection. That is, the preceding vehicle exhibits a behavior similar to that in turning at the intersection when the preceding vehicle stops at a road shoulder or makes a U-turn. According to this form, an intersection is identified based on the information acquired by the intersection information acquirer, resulting in an appropriate assistance for the following of the preceding vehicle that turns at the intersection. There may be employed a car navigation system equipped with the GPS function as the "intersection information acquirer" in this form. In an instance where the own vehicle is equipped with a camera configured to monitor the front side of the own vehicle and the intersection can be identified by analyzing images taken by the camera, the camera may function as the intersection information acquirer. That is, the forward information acquirer as described above may function also as the intersection information acquirer.

(6) The vehicle driving assistance system according to any one of the forms (1) through (5), wherein the assistance processing executing device includes a steering force control interrupting portion configured to interrupt the steering-force control in turning that is being executed by the steering-force control portion.

In a situation in which the steering force is being controlled in the preceding-vehicle following processing in turning, it is sometimes preferable to interrupt execution of the control due to some reasons. This form is effective in such a case.

(7) The vehicle driving assistance system according to the form (6), wherein the steering force control interrupting portion is configured to interrupt the steering-force control in turning when the own vehicle is shifted, beyond a set degree, from the traveling track of the preceding vehicle identified by the traveling track identifying portion.

This form relates to a specific condition for interrupting the steering-force control in turning. For instance, even if the preceding vehicle turns to the right or the left at an intersection of a five-forked road and the own vehicle turns in the same direction at the intersection, the direction of traveling may differ between the preceding vehicle and the own vehicle. In other words, even if the preceding vehicle and the own vehicle turn in the same direction, there is a possibility that the preceding vehicle does not travel on the traveling path on which the own vehicle is to travel. Further, there may be a case in which an unexpected situation needs to be avoided during turning, for instance. In these cases, the driver tends to intentionally operate a steering operation member in a direction in which he/she desires to direct the own vehicle, by a force beyond the applied steering force. Due to this driver's operation, the own vehicle behaves so as to be shifted, to a somewhat large extent, from the traveling track of the preceding vehicle. According to this form, the steering-force control in turning is interrupted, namely, execution of the preceding-vehicle following processing in turning is interrupted, in such an instance, thereby preventing a driver's intended operation of the own vehicle from being hindered by the steering force generated by the steering-force applying device.

(8) The vehicle driving assistance system according to form (6) or (7), wherein the steering force control interrupting portion is configured to interrupt the steering-force control in turning when a turning index, indicative of severity of turning of the own vehicle, exceeds a set value.

This form relates to another specific condition for interrupting the steering-force control in turning. Even when the own vehicle is turning along the traveling track of the preceding vehicle, the turning of the own vehicle may become severe turning, namely, the so-called steep turning. According to this form, the steering-force control in turning is interrupted, namely, execution of the preceding-vehicle following processing in turning is interrupted, in such an instance, thereby preventing the traveling of the own vehicle from becoming unstable. As the "turning index" in this form, there may be employed a side force or a cornering force that acts on the vehicle, a yaw rate of the vehicle, lateral acceleration of the vehicle or the like. The "severity of turning" may be also referred to as "intensity of turning".

(9) The vehicle driving assistance system according to any one of the forms (1) through (8), wherein the assistance processing executing device is configured to prohibit the steering-force control portion from executing the steering-force control in turning when a traveling speed of the own vehicle exceeds a set speed.

There is a strong likelihood that the behavior of the own vehicle becomes unstable when the own vehicle turns in a state in which the own vehicle is traveling at a high speed beyond a certain degree. According to this form, the steering-force control in turning is interrupted, namely, execution of the preceding-vehicle following processing in turning is interrupted, in such an instance, thereby preventing the behavior of the vehicle from becoming unstable.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
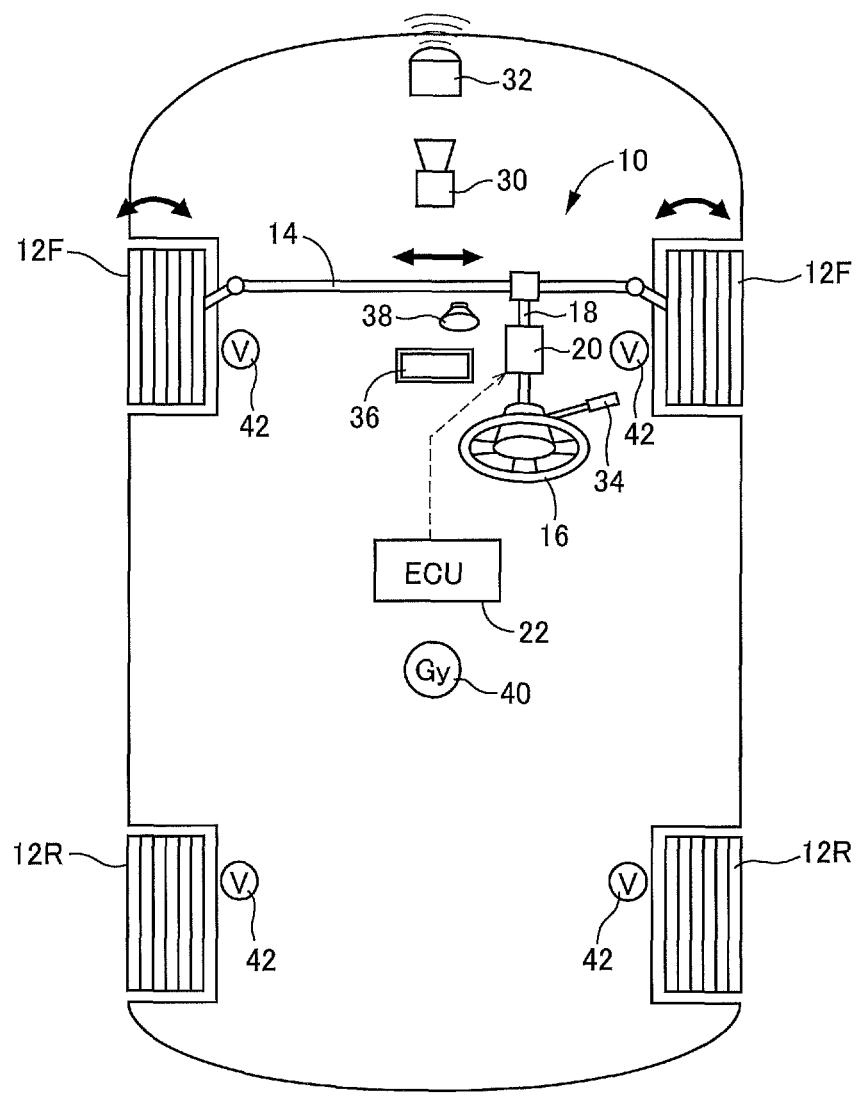
FIG. 1 is a schematic view of an overall structure of a vehicle driving assistance system according to one embodiment.

Referring to the drawings, there will be explained below in detail a vehicle driving assistance system according to one embodiment of the claimable invention. It is to be understood that the claimable invention is not limited to the details of the following embodiment, but may be embodied based on the forms described in Forms of the Invention and may be changed and modified based on the knowledge of those skilled in the art.

A. Overall Structure of Steering System and Vehicle Driving Assistance System

The vehicle driving assistance system according to the present embodiment is a system for assisting a driver's steering operation by applying a steering force to steerable wheels when an own vehicle is made to follow a preceding vehicle as a vehicle which is running ahead of the own vehicle. As schematically shown in FIG. 1, a steering system 10 of a vehicle on which the assistance system is installed includes: (A) a steering rod 14 coupled at its opposite ends to respective front wheels 12F (each as a steerable wheel) through respective tie rods; (B) a steering wheel 16, as a steering operation member, to be operated by a driver; (C) a steering shaft 18 which is fixed at its rear end to the steering wheel 16 and which is coupled at its front end to the steering rod 14 through a gear mechanism so as to move the steering rod 14 in the right-left direction; (D) a steering-force applying device 20 provided on the steering shaft 18 for applying a steering force to the front wheels 12F independently of a force applied to the steering wheel 16 by the driver; and (E) a steering electronic control unit 22 (hereinafter abbreviated as "steering ECU 22" or "ECU 22") configured to control the steering-force applying device 20. In terms of hardware, the steering system 10 is an ordinary power steering system.

While not shown, the steering shaft 18 is constituted by a front-side portion and a rear-side portion which are connected to each other through a torsion bar. The steering-force applying device 20 has an electric motor as a drive source. A torque generated by the electric motor acts on the front-side portion of the steering shaft 18, whereby a steering force is applied to the front wheels 12. The ECU 22 controls an electric power supplied to the electric motor, whereby the steering force applied by the steering-force applying device 20 is controlled. Like ordinary power steering systems, the steering system 10 assists the driver's steering operation such that the steering force having a magnitude in accordance with a twisted amount of the torsion bar is applied by the control executed by the ECU 22. The control of the steering force for the assistance will be referred to as "normal steering force control" where appropriate, and the steering force to be applied by the normal steering force control will be referred to as "normal steering force" where appropriate.

The vehicle driving assistance system according to the embodiment may be considered as including a part of the steering system 10, specifically, may be considered as including the steering-force applying device 20 and the steering ECU 22. Main processing in the present vehicle driving assistance system is processing for assisting traveling of the own vehicle along a traveling track of the preceding vehicle, namely, processing for assisting a steering operation that permits the own vehicle to travel along the traveling track of the preceding vehicle. (This processing will be hereinafter referred to as "preceding-vehicle following processing" where appropriate.) The preceding-vehicle following processing is also executed by the steering ECU 22 including a computer as a main constituent element. That is, the steering ECU 22 functions as an assistance processing executing device.

In addition to the steering-force applying device 20 and the steering ECU 22, the vehicle driving assistance system according to the embodiment further includes: a camera 30 and a radar 32 (millimeter wave radar) each as a forward information acquirer for acquiring information about the front side of the own vehicle (hereinafter referred to as "forward information" where appropriate); a winker lever 34 (operation lever of direction indicators), as a turning intention receiver, for receiving a driver's intention to turn the own vehicle to the right or the left; a car navigation terminal 36, as an intersection information acquirer, for acquiring information about intersections present on a traveling path of the own vehicle; a speaker 38 for transmitting, by sound, instructions from the steering ECU 22 to the driver; a lateral acceleration sensor 40 for detecting lateral acceleration as a turning index indicative of severity of turning of the own vehicle; and wheel speed sensors 42 provided for the respective front wheels 12F and rear wheels 12R for detecting a traveling speed of the own vehicle.

B. Preceding-Vehicle Following Processing Executed by Steering ECU i) Following Steering Force Control in Each of Two Sorts of Preceding-Vehicle Following Processing In addition to the normal steering force control explained above, the vehicle driving assistance system according to the embodiment executes a steering force control for following the preceding vehicle (hereinafter referred to as "following steering force control" where appropriate). The following steering force control is for controlling the steering force applied by the steering-force applying device 20 to assist the driver's steering operation when the own vehicle travels along the traveling track of the preceding vehicle, specifically, the immediately preceding vehicle. Hereinafter, the steering force generated by the following steering force control will be referred to as "following steering force" where appropriate. Further, processing by the ECU 22 for executing the following steering force control will be referred to as "preceding-vehicle following processing" where appropriate.

Two sorts of the following steering force control are prepared, i.e., a steering-force control in straight-ahead traveling and a steering-force control in turning. The steering-force control in straight-ahead traveling is executed when the preceding vehicle travels straight ahead, and the own vehicle also travels straight ahead. The steering-force control in turning is executed when the preceding vehicle turns at an intersection, and the own vehicle also turns at the same intersection in the same direction. The steering-force control in straight-ahead traveling is executed by execution of preceding-vehicle following processing in straight-ahead traveling by the ECU 22. The steering-force control in turning is executed by execution of preceding-vehicle following processing in turning by the ECU 22.

In the present vehicle driving assistance system, the ECU 22 identifies the immediately preceding vehicle as the preceding vehicle which is a target vehicle to follow, based on the information acquired by the camera 30 and the radar 32, and identifies the traveling track along which the identified preceding vehicle has traveled. The identification of the preceding vehicle and the identification of the traveling track thereof are a precondition for executing the preceding-vehicle following processing.

Figure 2A:
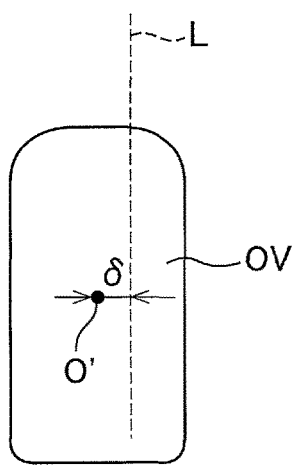
FIG. 2A is a conceptual view for explaining traveling of an own vehicle along a traveling track of a preceding vehicle.

The steering-force control in straight-ahead traveling executed in the preceding-vehicle following processing in straight-ahead traveling is executed when the preceding vehicle and the own vehicle travel straight ahead on the traveling path of the own vehicle. In the steering-force control in straight-ahead traveling, when a preceding vehicle PV is shifted rightward within a traveling lane as shown in FIG. 2A, for instance, the steering-force applying device 20 generates the following steering force that assists traveling of an own vehicle OV so as to move straight ahead along a traveling track L of the identified preceding vehicle PV, namely, traveling of the own vehicle so as to be shifted rightward, like the preceding vehicle PV. In other words, the steering-force applying device 20 applies, to the wheels, the following steering force for assisting the driver's steering operation that permits such straight-ahead traveling.

Figure 2B:
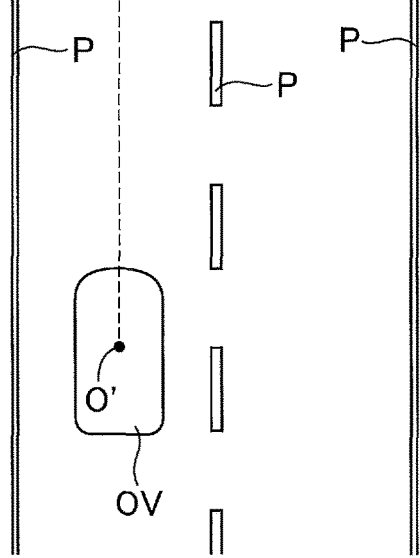
FIG. 2B is another conceptual view for explaining traveling of the own vehicle along the traveling track of the preceding vehicle.

The traveling track L of the preceding vehicle PV is defined by a locus of a center point O of the preceding vehicle PV. As shown in FIG. 2B, based on a shift amount δ at that time, there is determined the following steering force F in a direction to decrease the shift that has a magnitude determined according to an equation below. Here, the shift amount δ is defined as an amount of shift, in the right-left direction, of a center point O' of the own vehicle OV with respect to the traveling track L.

$$F = \alpha \times \delta \quad \alpha: \text{gain}$$

The steering-force applying device 20 is controlled such that the thus determined following steering force F is applied to the wheels.

Figure 2C:
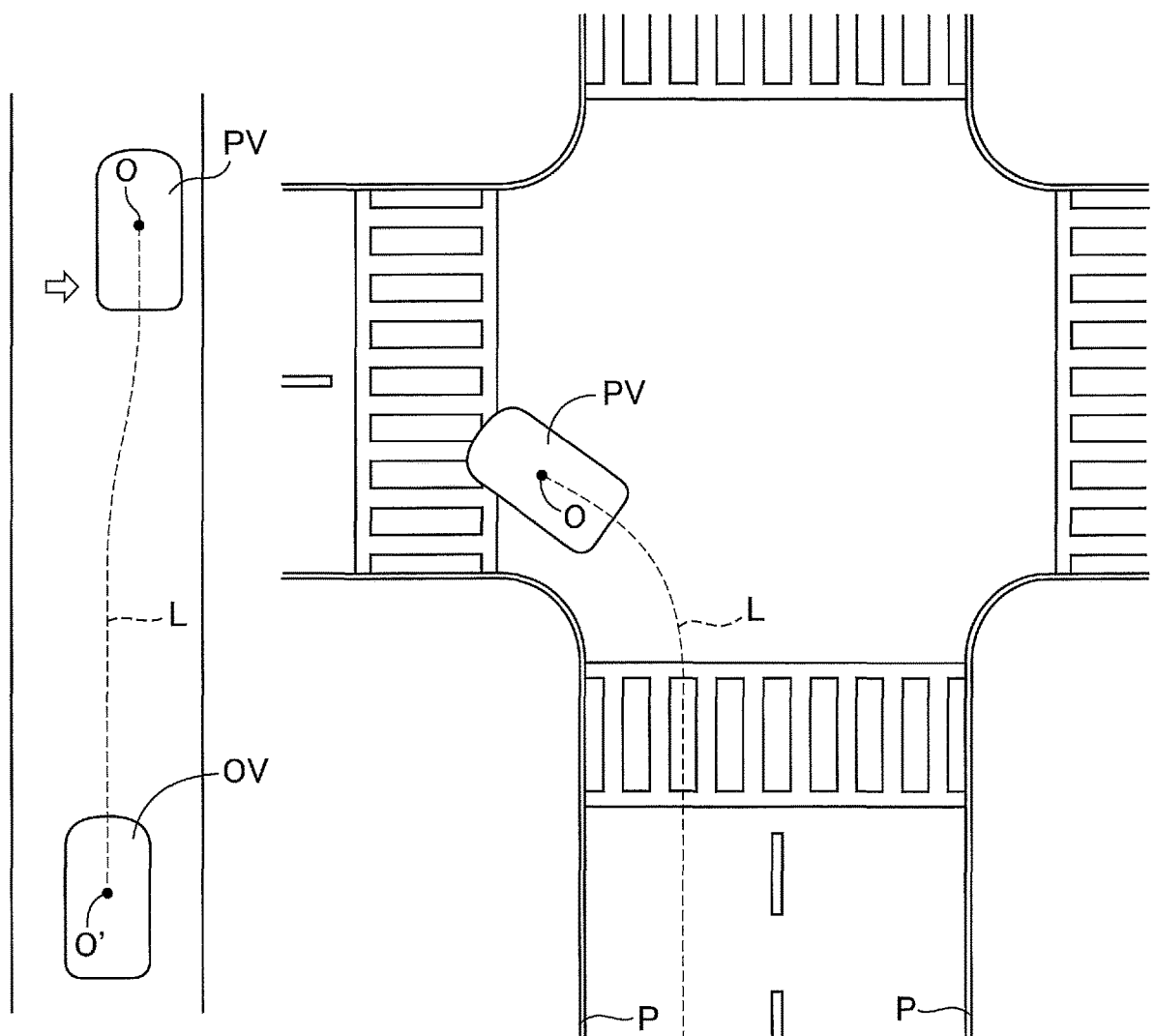
FIG. 2C is still another conceptual view for explaining traveling of the own vehicle along the traveling track of the preceding vehicle.

The steering-force control in turning executed in the preceding-vehicle following processing in turning is executed when the preceding vehicle turns at an intersection present on the traveling path of the own vehicle and the own vehicle also turns at the intersection in the same direction. For instance, as shown in FIG. 2C, the steering-force control in turning is executed when the preceding vehicle PV turns to the left at an intersection of crossroads (four-forked road), and the own vehicle OV also turns at the intersection to the left, and the following steering force is generated which assists turning of the own vehicle at the intersection along the traveling track L. In other words, there is applied, to the wheels, the following steering force which assists the driver's steering operation to make such turning. The traveling path shown in FIG. 2C is a two-lane road having two lanes in which vehicles respectively travel in mutually opposite directions, and three lane division lines P including a centerline and two road shoulder lines exist. On the traveling path, the lane division line P as the centerline is discontinued at the intersection, makes it impossible to execute the turning control utilizing the lane division line P.

As in the steering-force control in straight-ahead traveling, the following steering force F is determined in the steering-force control in turning, and the steering-force applying device 20 is controlled such that the determined following steering force F is applied to the wheels.

Execution of the following steering force control explained above enables the own vehicle OV to appropriately travel straight ahead in dependence on the traveling of the preceding vehicle PV on the traveling path on which no lane division lines P exist. Further, in a case in which the lane division line P (the centerline) is discontinued at the intersection even if the lane division lines P exist on the traveling path, it is possible to appropriately turn the own vehicle OV in dependence on the traveling of the preceding vehicle PV.

As explained above, the steering ECU 22 also executes, the normal steering force control in addition to the following steering force control, and the normal steering force generated in the normal steering force control is also applied to the front wheels 12F. Consequently, the steering-force applying device 20 actually generates the steering force which is a sum of the following steering force F and the normal steering force. Specifically, when the following steering force F and the normal steering force are in the same direction, the steering force in which the following steering force F and the normal steering force are added is applied to the front wheels 12F. On the other hand, when the following steering force F and the normal steering force are in mutually opposite directions, the steering force corresponding to a difference therebetween is applied to the front wheels 12F. In the following steering force control, by adjusting the gain a, it is possible to apply, to the front wheels 12F, the following steering force to such an extent that the driver's steering operation is not substantially required. It is further possible to apply, to the front wheels 12F, the following steering force to such an extent that the driver's steering operation is lightly assisted.

ii) Conditions for Executing Preceding-Vehicle Following Processing

Determination as to whether the following steering force control is to be executed, namely, determination as to whether the steering-force control in straight-ahead traveling or the steering-force control in turning is to be executed, is made based on: recognition as to whether the preceding vehicle PV is turning to the right or the left; and recognition as to whether the own vehicle OV is to turn and as to a direction of the turning of the own vehicle OV. The former recognition will be hereinafter referred to as "recognition as to turning of the preceding vehicle" where appropriate while the latter recognition will be hereinafter referred to as "recognition as to turning of the own vehicle" where appropriate.

The recognition as to turning of the preceding vehicle is made based on the forward information acquired by the camera 30 and the radar 32. In this respect, it may be possible to recognize that the preceding vehicle PV is turning to the right or the left by detecting the behavior of the preceding vehicle PV, the turning instruction by the direction indicator of the preceding vehicle PV, or the like. In the present vehicle driving assistance system, however, it is recognized that the preceding vehicle PV is turning when the traveling track L identified based on the forward information has a shape indicating the turning of the vehicle. Further, the direction of the turning of the preceding vehicle PV, i.e., the right or the left, is recognized based on the shape of the traveling track L.

The recognition as to turning of the own vehicle is made not based on whether the own vehicle OV is actually turning, but based on the driver's intention to turn. Specifically, it is recognized that the own vehicle OV is to turn when the winker lever 34 is operated. Further, the direction of the turning of the own vehicle OV is recognized based on a direction of the operation of the winker lever 34.

The steering-force control in straight-ahead traveling is executed when it is recognized that the preceding vehicle PV is not turning and the own vehicle OV is also not to turn. When it is recognized that only one of the preceding vehicle PV and the own vehicle OV is turning or is to turn, the following steering force control is not executed.

When it is recognized that the preceding vehicle PV is turning and the own vehicle OV is also to turn, there will be made determinations as to three associated conditions: i) The turning of the preceding vehicle PV is turning at the intersection on the traveling path of the own vehicle; ii) The direction of the turning of the preceding vehicle PV and the direction of the turning of the own vehicle OV are the same; and iii) The traveling speed v of the own vehicle is not higher than a set speed $v_0$ (e.g., 40 km/h). When the three conditions are satisfied as a result of the determinations, the steering-force control in turning is executed. When at least one of the three conditions is not satisfied, the following steering force control is not executed.

The determination as to the condition that the turning of the preceding vehicle PV is turning at the intersection present on the traveling path of the own vehicle OV is made based on information about the traveling path of the own vehicle OV sent from the car navigation terminal 36, namely, based on information about the intersections present on the traveling path. The condition that the traveling speed v of the own vehicle OV is not higher than the set speed $v_0$ is for preventing the turning of the own vehicle OV from becoming unstable when the own vehicle OV turns so as to follow the preceding vehicle PV. The determination as to the condition relating to the traveling speed is made based on detected values of the wheel speed sensors 42 provided for the respective wheels 12F, 12R.

Even in a case in which the steering-force control in turning is being executed, a situation may occur where the steering-force control in turning should be interrupted. In view of such a situation, two conditions are set in advance each as a condition for interrupting the steering-force control in turning. One of the two conditions is that lateral acceleration Gy is beyond set lateral acceleration $Gy_0$. Here, the lateral acceleration Gy is a turning index indicative of severity of turning of the own vehicle OV. When the lateral acceleration Gy is beyond the set lateral acceleration $Gy_0$, the steering-force control in turning is interrupted for the purpose of preventing the traveling of the own vehicle from becoming unstable due to the turning to follow the preceding vehicle. The other of the two conditions is that the own vehicle is shifted from the identified traveling track L of the preceding vehicle PV by an amount beyond a set degree, namely, the shift amount δ is larger than a set amount $δ_0$. For instance, when both of the preceding vehicle PV and the own vehicle OV turn to the right or the left on a five-forked road, the direction in which the preceding vehicle PV is to travel and the direction in which the own vehicle OV is to travel may differ from each other. Thus, the latter condition is set for giving a higher priority to the driver's intention. It is noted that the latter condition is set also for interrupting the steering-force control in straight-ahead traveling.

iii) Special Considerations in Preceding-Vehicle Following Processing in Turning When the own vehicle OV turns so as to follow the preceding vehicle PV, the preceding vehicle PV mostly finishes its turning and travels straight ahead on the traveling path of the own vehicle OV, in the middle stage of turning of the own vehicle OV. In view of this, even if it is recognized that the preceding vehicle PV is traveling straight ahead in the recognition as to turning of the preceding vehicle and it is recognized that the own vehicle OV is turning in the recognition as to turning of the own vehicle in a state in which the preceding-vehicle following processing in turning is being executed, the preceding-vehicle following processing in turning is kept executed. That is, the steering-force control in turning is continued.

On one occasion, the preceding-vehicle following processing in turning is initiated when the preceding vehicle PV starts turning after a time point when the driver's intention to turn the own vehicle OV is received. On another occasion, the preceding-vehicle following processing in turning is initiated when the driver's intention to turn the own vehicle OV is received after a time point when the preceding vehicle PV starts turning. In view of the latter occasion, the driver is encouraged to indicate the intention to turn the own vehicle OV through the winker lever 34, namely, a request for indicating the intention to turn (turning intention) is made, at the time point when the preceding vehicle PV starts turning. The request for indicating the turning intention is made by sound through the speaker 38. For instance, the request is made through the speaker 38 saying "The preceding vehicle is turning. Is this vehicle going to turn?" In an instance where the request has been made, the preceding vehicle PV that has started turning is maintained as a target for the preceding-vehicle following processing in turning until a lapse time t, which elapses after the request has been made, exceeds a set time $t_0$. When the turning intention of the own vehicle OV is received before the lapse time t exceeds the set time $t_0$, the own vehicle OV is permitted to turn so as to follow the preceding vehicle PV that is maintained as the target. On the other hand, when the turning intention of the own vehicle OV is not received even after the lapse time t exceeds the set time $t_0$, the preceding vehicle PV is excluded from the target to follow.

iv) Control Flow

Figure 3:
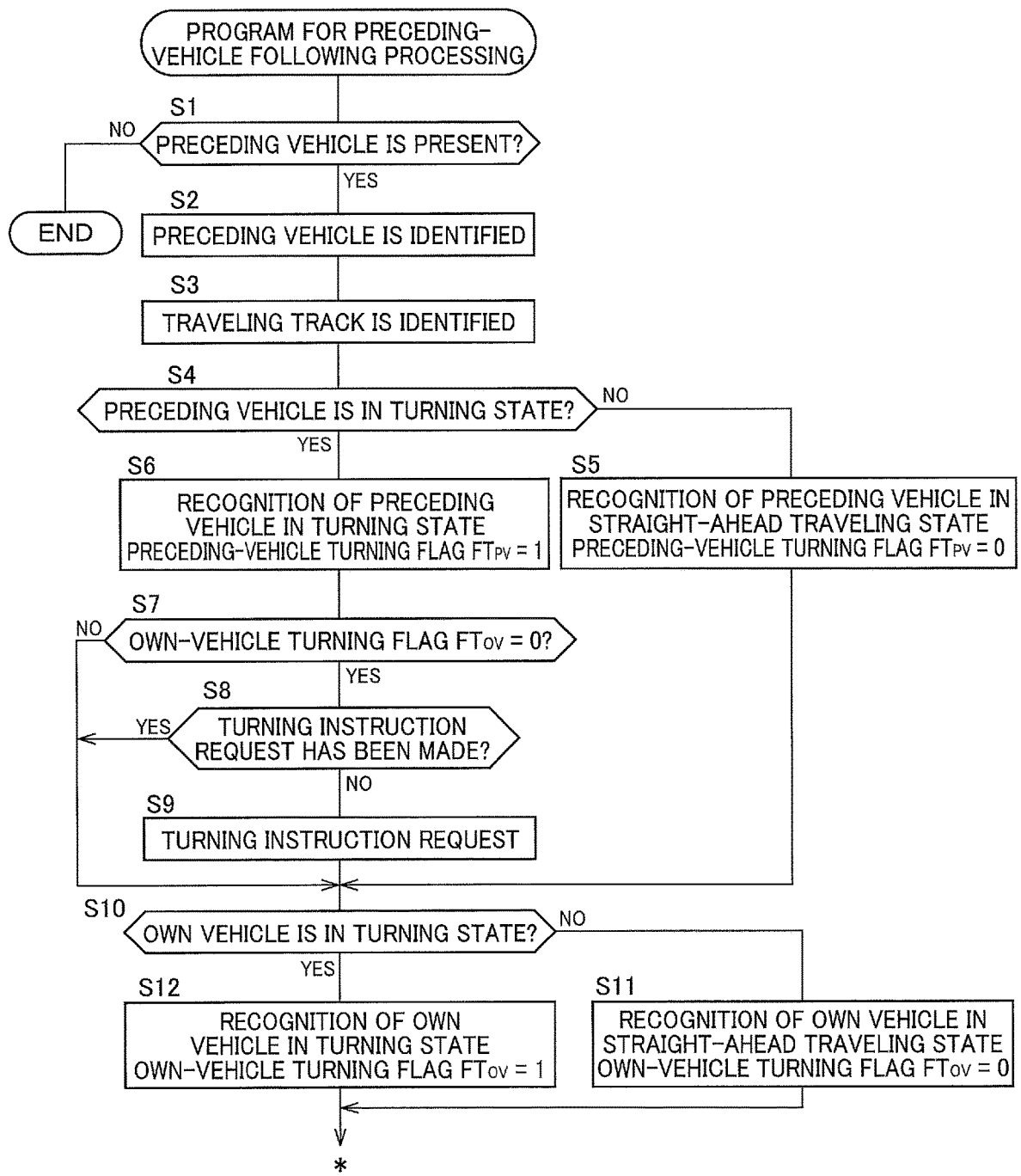
FIG. 3 is a flowchart showing a former half portion of a program for preceding-vehicle following processing executed by an assistance processing executing device of the vehicle driving assistance system according to the embodiment.
Figure 4:
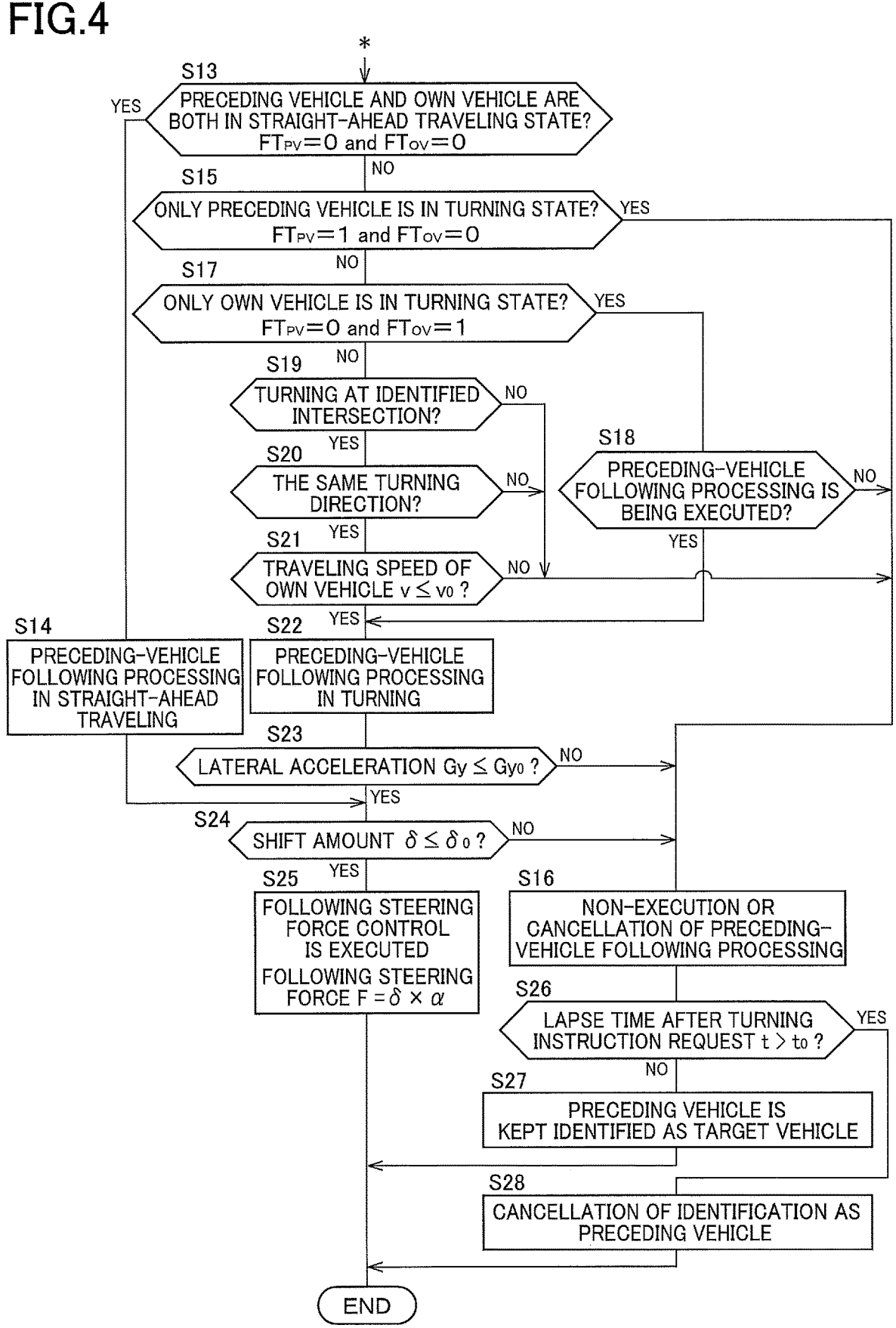
FIG. 4 is a flowchart showing a latter half portion of the program for preceding-vehicle following processing executed by the assistance processing executing device of the vehicle driving assistance system according to the embodiment.

The preceding-vehicle following processing, namely, the following steering force control, is executed such that the ECU 22 executes a program for the preceding-vehicle following processing indicated by flowcharts shown in FIGS. 3 and 4, at a short time pitch (e.g., several to several tens of milliseconds). Referring to the flowcharts, there will be hereinafter briefly explained a flow of the processing executed by the ECU 22.

In the program for the preceding-vehicle following processing, step 1 is implemented to determine whether the preceding vehicle is present based on the forward information acquired by the camera 30 and the radar 32. (The step 1 will be hereinafter abbreviated as "S1". The other steps are similarly abbreviated). When the preceding vehicle is not present, the program is ended. When the preceding vehicle is present, the immediately preceding vehicle is identified at S2 as the preceding vehicle which is a target vehicle to follow. At S3, the traveling track of the preceding vehicle is identified based on the forward information.

At S4, the recognition as to turning of the preceding vehicle is made, namely, it is recognized whether the identified preceding vehicle turns or is turning, in other words, whether the preceding vehicle is in a turning state, based on the shape of the identified traveling track. When the preceding vehicle is not in the turning state, it is recognized at S5 that the preceding vehicle travels straight ahead or is traveling straight ahead, in other words, it is recognized at S5 that the preceding vehicle is in a straight-ahead traveling state. This program employs a preceding-vehicle turning flag $FT_{PV}$. The value of the preceding-vehicle turning flag $FT_{PV}$ is set to "1" when the preceding vehicle is in the turning state and is set to "0" when the preceding vehicle is in the straight-ahead traveling state. Thus, at S5, the preceding-vehicle turning flag $FT_{PV}$ is set to "0". On the other hand when the preceding vehicle is in the turning state, it is recognized at S6 that the preceding vehicle is in the turning state, and the preceding-vehicle turning flag $FT_{PV}$ is set to "1". In this instance, the direction of the turning of the preceding vehicle, i.e., the right or the left, is also recognized.

The program employs an own-vehicle turning flag $FT_{OV}$. The value of the own-vehicle turning flag $FT_{OV}$ is set to "1" when the driver of the own vehicle indicates the turning intention, in other words, when the own vehicle is in a turning state, and is set to "0" when the driver of the own vehicle does not indicate the turning intention, in other words, when the own vehicle is in a straight-ahead traveling state. When it is recognized at S6 that the preceding vehicle is in the turning state, it is determined at S7 whether the own vehicle is in the turning state or in the straight-ahead traveling state, based on the value of the own-vehicle turning flag $FT_{OV}$. When the own vehicle is in the straight-ahead traveling state, it is determined at S8 whether the request for indicating the turning intention has been already made, namely, whether a turning instruction request for requesting the driver to operate the winker lever 34 has been already made. When the request is not yet made, the turning instruction request is made at S9. When it is determined at S7 that the own vehicle is in the turning state or when it is determined at S8 that the turning instruction request has been already made, the turning instruction request at S9 is skipped.

At S10, the recognition as to turning of the own vehicle is made, namely, it is determined whether the own vehicle is in the turning state, based on the operation state of the winker lever 34. When it is determined that the own vehicle is not in the turning state, the control flow goes to S11. At S11, it is recognized that the own vehicle is in the straight-ahead traveling state, and the value of the own-vehicle turning flag $FT_{OV}$ is set to "0". When it is determined that the own vehicle is in the turning state, the control flow goes to S12. At S12, it is recognized that the own vehicle is in the turning state, and the value of the own-vehicle turning flag $FT_{OV}$ is set to "1". In this instance, the direction of the turning of the own vehicle, i.e., the right or the left, is also recognized.

At S13, it is determined that both of the preceding vehicle and the own vehicle are in the straight-ahead traveling state when the values of both of the preceding-vehicle turning flag $FT_{PV}$ and the own-vehicle turning flag $FT_{OV}$ are "0". In this case, the control flow goes to S14 at which execution of the preceding-vehicle following processing in straight-ahead traveling is determined. When one or both of the preceding vehicle and the own vehicle is not in the straight-ahead traveling state, the control flow goes to S15. At S15, it is determined that only the preceding vehicle is in the turning state when the value of the preceding-vehicle turning flag $FT_{PV}$ is "1" and the value of the own-vehicle turning flag $FT_{OV}$ is "0". In this case, the control flow goes to S16 at which non-execution of the preceding-vehicle following processing is determined or the preceding-vehicle following processing that is being executed is cancelled.

When it is not determined at S15 that only the preceding vehicle is in the turning state, it is determined at S17 that only the own vehicle is in the turning state when the value of the preceding-vehicle turning flag $FT_{PV}$ is "0" and the value of the own-vehicle turning flag $FT_{OV}$ is "1". When only the own vehicle is in the turning state, it is determined at S18 whether the preceding-vehicle following processing in turning is currently being executed. When the preceding-vehicle following processing in turning is not currently being executed, the control flow goes to S16 at which non-execution of the preceding-vehicle following processing is determined or the preceding-vehicle following processing that is being executed is cancelled.

When it is not determined at S17 that only the own vehicle is in the turning state, it means that both of the preceding vehicle and the own vehicle are in the turning state. In this case, there are made, at S19-S21, the determinations as to the three associated conditions for executing the preceding-vehicle following processing in turning. That is, it is determined at S19 whether the condition that the turning of the preceding vehicle is turning at the intersection present on the traveling path of the own vehicle is satisfied based on the intersection information sent from the car navigation terminal 36. It is determined at S20 whether the condition that the direction of the turning of the preceding vehicle and the direction of the turning of the own vehicle are the same is satisfied. It is determined at S21 whether the condition that the traveling speed of the own vehicle v is not higher than the set speed $v_0$ is satisfied.

When all of the conditions at S19-S21 are satisfied, the control flow goes to S22 at which execution of the preceding-vehicle following processing in turning is determined. When only the own vehicle is in the turning state and it is determined at S18 that the preceding-vehicle following processing in turning is currently being executed, the preceding-vehicle following processing in turning that is currently being executed is determined to be continued. This determination of continuation considers the situation explained above. That is, in an instance where the own vehicle turns so as to follow the preceding vehicle, the own vehicle is needed to continue to follow the preceding vehicle if the own vehicle is in the midst of turning even after the preceding vehicle has finished its turning. In such a situation, the preceding-vehicle following processing in turning is continued.

Even when execution of the preceding-vehicle following processing in turning is initiated or execution of the preceding-vehicle following processing in turning is continued, it is determined at S23, S24 whether the conditions for interrupting the preceding-vehicle following processing in turning are not satisfied, in other words, whether the conditions for allowing execution of the preceding-vehicle following processing in turning are satisfied. Specifically, it is determined at S23 whether the lateral acceleration Gy of the own vehicle is not larger than the set lateral acceleration $Gy_0$, based on the detection value of the lateral acceleration sensor 40. Further, it is determined at S24 whether the shift amount δ, which is an amount of shift of the own vehicle from the traveling track of the preceding vehicle, is not larger than the set amount $δ_0$. The former is a condition that takes account of the stability of the own vehicle. The latter is a condition for placing importance on the driver's intention to move the own vehicle in a direction different from the preceding vehicle. When the two conditions are satisfied, in other words, when none of the conditions for interrupting execution of the preceding-vehicle following processing in turning are satisfied, the following steering force control is executed at S25. On the other hand, when one of the two conditions is not satisfied, in other words, when one of the conditions for interrupting execution of the preceding-vehicle following processing in turning is satisfied, execution of the preceding-vehicle following processing S16 is canceled. When execution of the preceding-vehicle following processing in straight-ahead traveling is determined at S14, the control flow goes to S24. When it is determined at S24 that the shift amount δ, which is an amount of the shift of the own vehicle from the traveling track of the preceding vehicle, is not larger than the set amount $δ_0$, the following steering force control at S25 is executed. When the shift amount δ is larger than the set amount $δ_0$, execution of the preceding-vehicle following processing in straight-ahead traveling is canceled.

In the following steering force control at S25, the steering force in the direction to eliminate the shift of the own vehicle from the traveling track of the preceding vehicle, i.e., the following steering force F, is determined based on the shift amount δ according to the above equation, and the steering-force applying device 20 is controlled so as to generate the determined following steering force F. That is, there is supplied, to the steering-force applying device 20, electric power for generating the following steering force F. It is noted that the following steering force control executed in the preceding-vehicle following processing in straight-ahead traveling corresponds to the steering-force control in straight-ahead traveling and the following steering force control executed in the preceding-vehicle following processing in turning corresponds to the steering-force control in turning.

When non-execution of the preceding-vehicle following processing is determined at S16 or when execution of the preceding-vehicle following processing is canceled at S16, the control flow goes to S26 at which it is determined whether the lapse time t is beyond the set time $t_0$. As explained above, the lapse time t is a time that elapses after the turning instruction request at S9 has been made, namely, after the request for indicating the driver's intention to turn the own vehicle has been made. This determination takes account of a time lag between a time point of starting of the turning of the preceding vehicle and a time point of indication of turning by the driver of the own vehicle. When the lapse time t is not longer than the set time $t_0$, the control flow goes to S27 at which the preceding vehicle is kept identified as the target vehicle to follow, and the preceding vehicle in question is identified, at S2 in next execution of the program, as the target for the own vehicle to follow. On the other hand, when it is determined at S26 that the lapse time t is beyond the set time $t_0$, the identification of the preceding vehicle is canceled at S28. That is, the preceding vehicle is excluded from the target for the own vehicle to follow.

The ECU 22 executes the processing according to the flow described above. In the processing, the preceding-vehicle following processing in straight-ahead traveling and the preceding-vehicle following processing in turning are executed, and the steering-force control in straight-ahead traveling and the steering-force control in turning are executed.

v) Functional Block of Steering Electronic Control Unit

Figure 5:
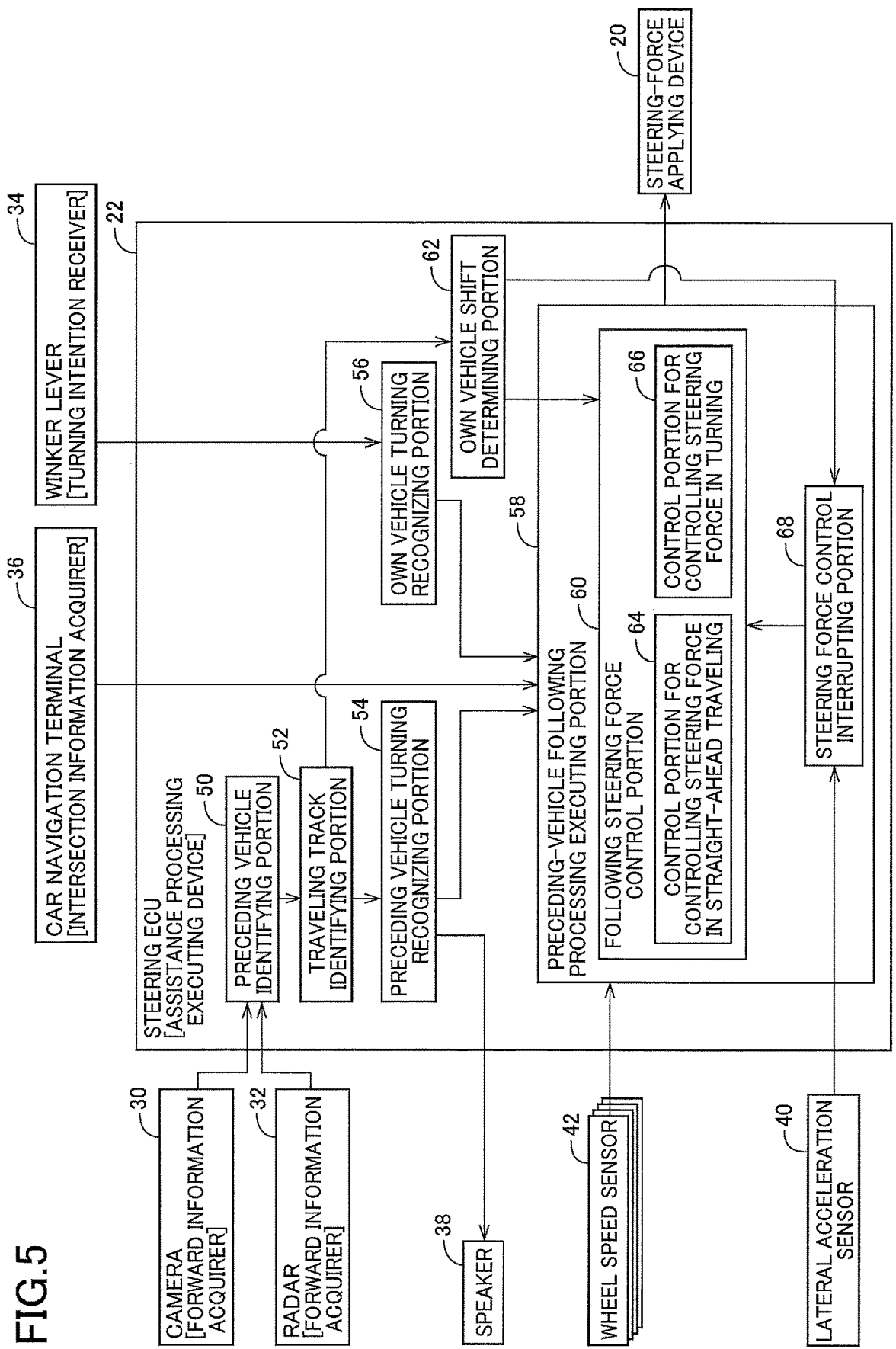
FIG. 5 is a block diagram conceptually showing functions of the assistance processing executing device of the vehicle driving assistance system according to the embodiment.

In view of execution of the following processing program explained above, the steering ECU 22 as the assistance processing executing device may be construed as having a functional configuration as illustrated in a block diagram of FIG. 5, namely, may be construed as including functional portions.

Specifically, the ECU 22 includes, as a functional portion to execute the processing at S1, S2, a preceding vehicle identifying portion 50 configured to identify the preceding vehicle based on the forward information sent from the camera 30 and the radar 32, each as the forward information acquirer. Further, the ECU 22 includes, as a functional portion to execute the processing at S3, a traveling track identifying portion 52 configured to identify the traveling track of the preceding vehicle identified by the preceding vehicle identifying portion 50, based on the forward information sent from the camera 30 and the radar 32.

The ECU 22 further includes, as a functional portion to execute the processing at S4-S9, a preceding vehicle turning recognizing portion 54 configured to recognize turning or straight-ahead traveling of the preceding vehicle based on the forward information sent from the camera 30 and the radar 32, specifically, based on the traveling track of the preceding vehicle identified by the traveling track identifying portion 52 based on the forward information. The turning instruction request at S9 by the preceding vehicle turning recognizing portion 54, namely, the request for encouraging the driver to indicate, on the winker lever 34, his/her intention to turn the own vehicle, is made through the speaker 38. Further, the ECU 22 includes, as a functional portion to execute the processing at S10-S12, an own vehicle turning recognizing portion 56 configured to recognize turning or straight-ahead traveling of the own vehicle based on the driver's operation on the winker lever 34 functioning as the turning intention receiver.

The ECU 22 includes a preceding-vehicle following processing executing portion 58 as a functional portion to execute the processing at S13-S28, namely, as a principal functional portion of the ECU 22. The preceding-vehicle following processing executing portion 58 includes a following steering force control portion 60 as a functional portion to execute the processing at S25, namely, as a principal functional portion of the following steering force control portion 60. The intersection information on which the preceding-vehicle following processing executing portion 58 relies in the determination at S19 is sent from the car navigation terminal 36 functioning as the intersection information acquirer. The determination at S21 is made based on the information sent from the wheel speed sensors 42. The ECU 22 includes an own vehicle shift determining portion 62 configured to execute the processing antecedent to the processing at S25. That is, the own vehicle shift determining portion 62 is configured to determine the shift amount of the own vehicle from the traveling track of the preceding vehicle identified by the traveling track identifying portion 52.

The following steering force control portion 60 is configured to determine the following steering force based on the shift amount determined by the own vehicle shift determining portion 62 and to control the steering-force applying device 20 based on the determined following steering force. The following steering force control portion 60 may be construed as being constituted by the control portion 64 for controlling the steering force in straight-ahead traveling that works in the preceding-vehicle following processing in straight-ahead traveling and the control portion 66 for controlling the steering force in turning that works in the preceding-vehicle following processing in turning.

The preceding-vehicle following processing executing portion 58 includes, as a functional portion to execute the processes at S23, S24, a steering force control interrupting portion 68 configured to interrupt the following steering force control. The steering force control interrupting portion 68 is configured to interrupt the following steering force control based on the shift amount determined by the own vehicle shift determining portion 62 and the lateral acceleration detected by the lateral acceleration sensor 40.

What is claimed is:

1. A vehicle driving assistance system for assisting a driver in driving a vehicle, comprising:
   a sensor positioned to acquire forward information for an own vehicle;
   a turning intention receiver comprising one of a turn signal lever, a switch, or a voice recognition device to receive an intention of the driver to turn the own vehicle to the right or the left;
   a steering-force motor coupled to a steering shaft of the vehicle to apply a steering force to a wheel of the vehicle; and
   an assistance processing executing device comprising a computer programmed to function as:
      a traveling track identifying portion that identifies a traveling track of a preceding vehicle that travels ahead of the own vehicle, based on the forward information acquired by the sensor;

a preceding vehicle turning recognizing portion that recognizes turning of the preceding vehicle to the right or the left;

an own vehicle turning recognizing portion that recognizes turning of the own vehicle and a direction of the turning of the own vehicle, based on the intention of the driver received by the turning intention receiver; and a steering-force control portion that executes a steering-force control in turning in which the steering-force motor applies, to the wheel, the steering force for assisting the turning of the own vehicle along the traveling track of the preceding vehicle identified by the traveling track identifying portion, when the turning of the preceding vehicle recognized by the preceding vehicle turning recognizing portion is turning at an intersection that is present on a traveling path of the own vehicle and a direction of the turning of the preceding vehicle at the intersection coincides with the direction of the turning of the own vehicle recognized by the own vehicle turning recognizing portion.

2. The vehicle driving assistance system according to claim 1, wherein the steering-force control portion further executes a steering-force control in straight-ahead traveling in which the steering-force motor applies, to the wheel, the steering force for assisting straight-ahead driving of the own vehicle along the traveling track of the preceding vehicle identified by the traveling track identifying portion, when the preceding vehicle and the own vehicle travel straight ahead on the traveling path of the own vehicle.

3. The vehicle driving assistance system according to claim 1, wherein the steering-force control portion controls the steering-force motor to apply, to the wheel, the steering force having a magnitude in accordance with a shift amount of the own vehicle from the traveling track of the preceding vehicle identified by the traveling track identifying portion.

4. The vehicle driving assistance system according to claim 1, wherein the computer of the assistance processing executing device is further programmed to request the driver to indicate his/her intention to turn the own vehicle on the turning intention receiver, when the preceding vehicle turning recognizing portion recognizes the turning of the preceding vehicle at the intersection to the right or the left.

5. The vehicle driving assistance system according to claim 1, further comprising an intersection information acquirer that acquires information about the intersection present on the traveling path of the own vehicle the intersection information acquirer comprising one of a navigation system including a GPS receiver or a camera positioned to acquire images in front of the own vehicle, wherein the steering-force control portion executes the steering-force control in turning when the preceding vehicle and the own vehicle turn at the intersection identified based on the information acquired by the intersection information acquirer.

6. The vehicle driving assistance system according to claim 1, wherein the computer of the assistance processing executing device is further programmed to function as a steering force control interrupting portion that interrupts the steering-force control in turning that is being executed by the steering-force control portion.

7. The vehicle driving assistance system according to claim 6, wherein the steering force control interrupting portion interrupts the steering-force control in turning when the own vehicle is shifted, beyond a set degree, from the traveling track of the preceding vehicle identified by the traveling track identifying portion.

8. The vehicle driving assistance system according to claim 6, wherein the steering force control interrupting portion interrupts the steering-force control in turning when a turning index, indicative of severity of turning of the own vehicle, exceeds a set value.

9. The vehicle driving assistance system according to claim 1, wherein the computer of the assistance processing executing device is further programmed to prohibit the steering-force control portion from executing the steering-force control in turning when a traveling speed of the own vehicle exceeds a set speed.

* * * * *